United States Patent [19]

Wissman et al.

[11] Patent Number: 4,925,113

[45] Date of Patent: May 15, 1990

[54] SCRAP TIRE PROCESSING APPARATUS

[75] Inventors: Terry L. Wissman; John B. Bornhorst, both of New Bremen, Ohio

[73] Assignee: The Minster Machine Company, Minister, Ohio

[21] Appl. No.: 340,911

[22] Filed: Apr. 20, 1989

[51] Int. Cl.⁵ .............................................. B02C 19/00
[52] U.S. Cl. ............................ 241/101.4; 241/101.7; 241/DIG. 31
[58] Field of Search .......... 241/101.4, 101.7, DIG. 31

[56] References Cited

U.S. PATENT DOCUMENTS

| | | | |
|---|---|---|---|
| 3,868,062 | 2/1975 | Cunningham et al. | 241/36 |
| 3,911,772 | 10/1975 | Kisielewski | 83/278 |
| 3,922,942 | 12/1975 | Fawcett et al. | 83/620 |
| 3,931,935 | 1/1976 | Holman | 241/24 |
| 4,052,013 | 10/1977 | Ehrlich et al. | 241/101.2 |
| 4,090,670 | 5/1978 | Bennett | 241/23 |
| 4,096,772 | 6/1978 | Hall et al. | 82/82 |
| 4,113,186 | 9/1978 | Smith | 241/24 |
| 4,119,277 | 10/1978 | Snyder et al. | 241/167 |
| 4,137,101 | 1/1979 | Stock | 148/9 R |
| 4,216,916 | 8/1980 | Tupper | 241/36 |
| 4,338,839 | 7/1982 | Farrell, Sr. et al. | 83/620 |
| 4,338,840 | 7/1982 | Farrell, Sr. et al. | 83/622 |
| 4,355,556 | 10/1982 | Ulsky | 83/124 |
| 4,405,090 | 9/1983 | Wakeem | 241/3 |
| 4,417,492 | 11/1983 | Winecoff | 82/46 |
| 4,422,581 | 12/1983 | Chryst | 241/101.4 X |
| 4,474,334 | 10/1984 | Tatai et al. | 241/1 |
| 4,560,112 | 12/1985 | Rouse et al. | 241/236 |
| 4,682,522 | 7/1987 | Barclay | 83/19 |
| 4,684,071 | 8/1987 | Dicky | 241/DIG. 31 X |
| 4,694,716 | 9/1987 | Sakamoto | 83/112 |
| 4,714,201 | 12/1987 | Rouse et al. | 251/24 |
| 4,840,316 | 6/1989 | Barclay | 241/DIG. 31 X |

FOREIGN PATENT DOCUMENTS

| | | | |
|---|---|---|---|
| 1579098 | 3/1971 | Fed. Rep. of Germany | 241/DIG. 31 |
| 54779 | 5/1977 | Japan | 241/DIG. 31 |

Primary Examiner—Timothy V. Eley
Attorney, Agent, or Firm—Jeffers Hoffman & Niewyk

[57] ABSTRACT

An apparatus for processing a scrap rubber tire carcass having a circumferential crown and a pair of sidewalls extending generally radially inwardly from and generally perpendicular to the crown, each of the sidewalls having an inner circumferential edge. Included are tire holding apparatus for holding the tire carcass while cutter blades cut the held tire carcass through from the inner circumferential edge to the crown substantially along a single radius at one place. Pinch rollers advance the cut tire carcass longitudinally in a direction generally tangent to the circumference of the drown while a spreading channel receives the cut end and on a continuous basis flattens the sidewalls such that the sidewalls and crown lie substantially in a common plane. The flattened carcass is advanced by additional pinch rollers into a granulator which chops the received tire carcass to particles. Rotating cutter blades shear off the beads from the sidewalls in scissors fashion prior to flattening of the sidewalls and slitter rolls having interdigitated cutting disks slit the flattened tire longitudinally prior to entry thereof into the granulator.

26 Claims, 9 Drawing Sheets

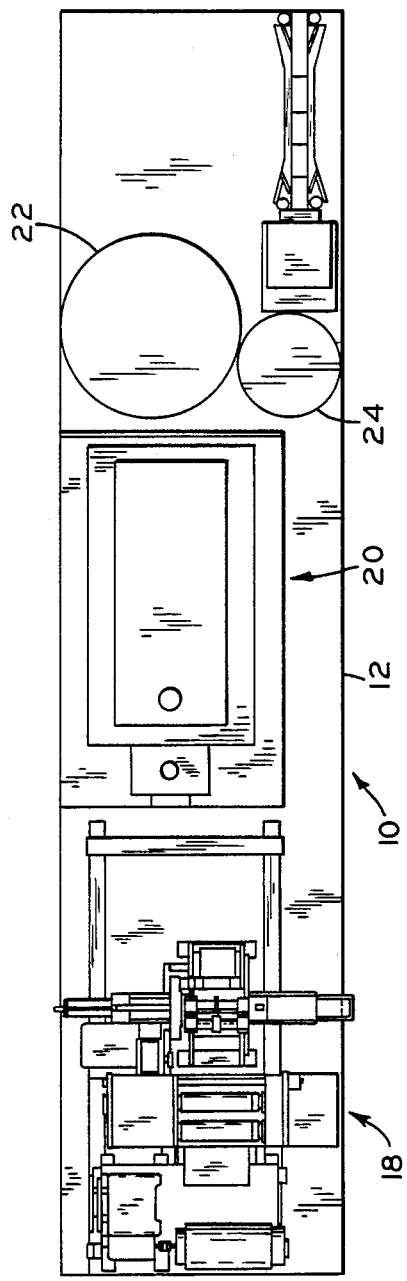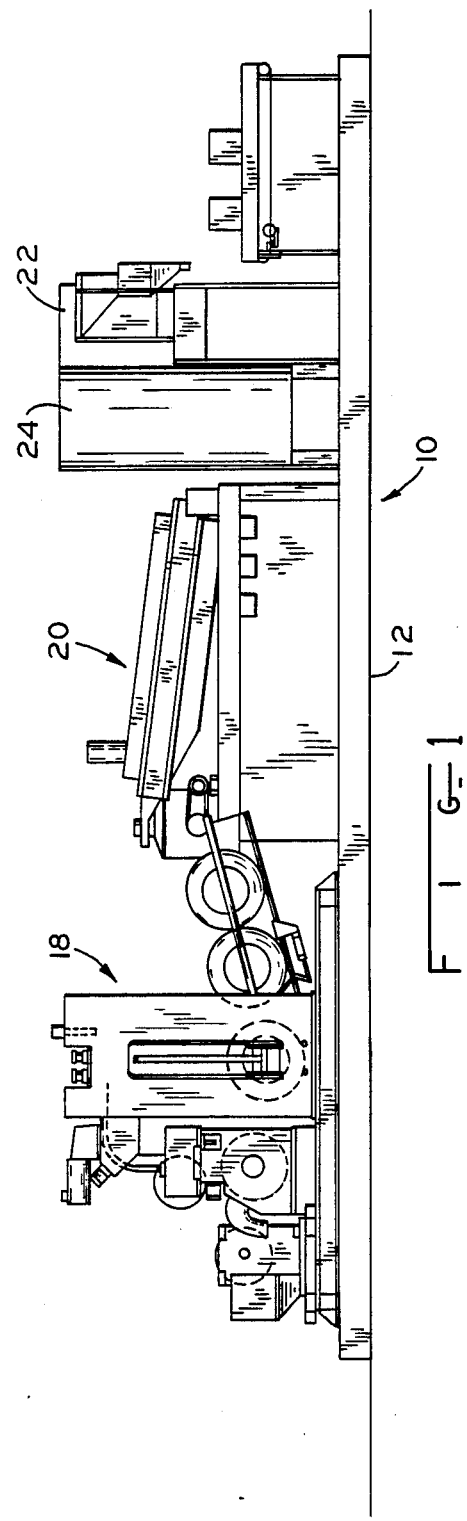

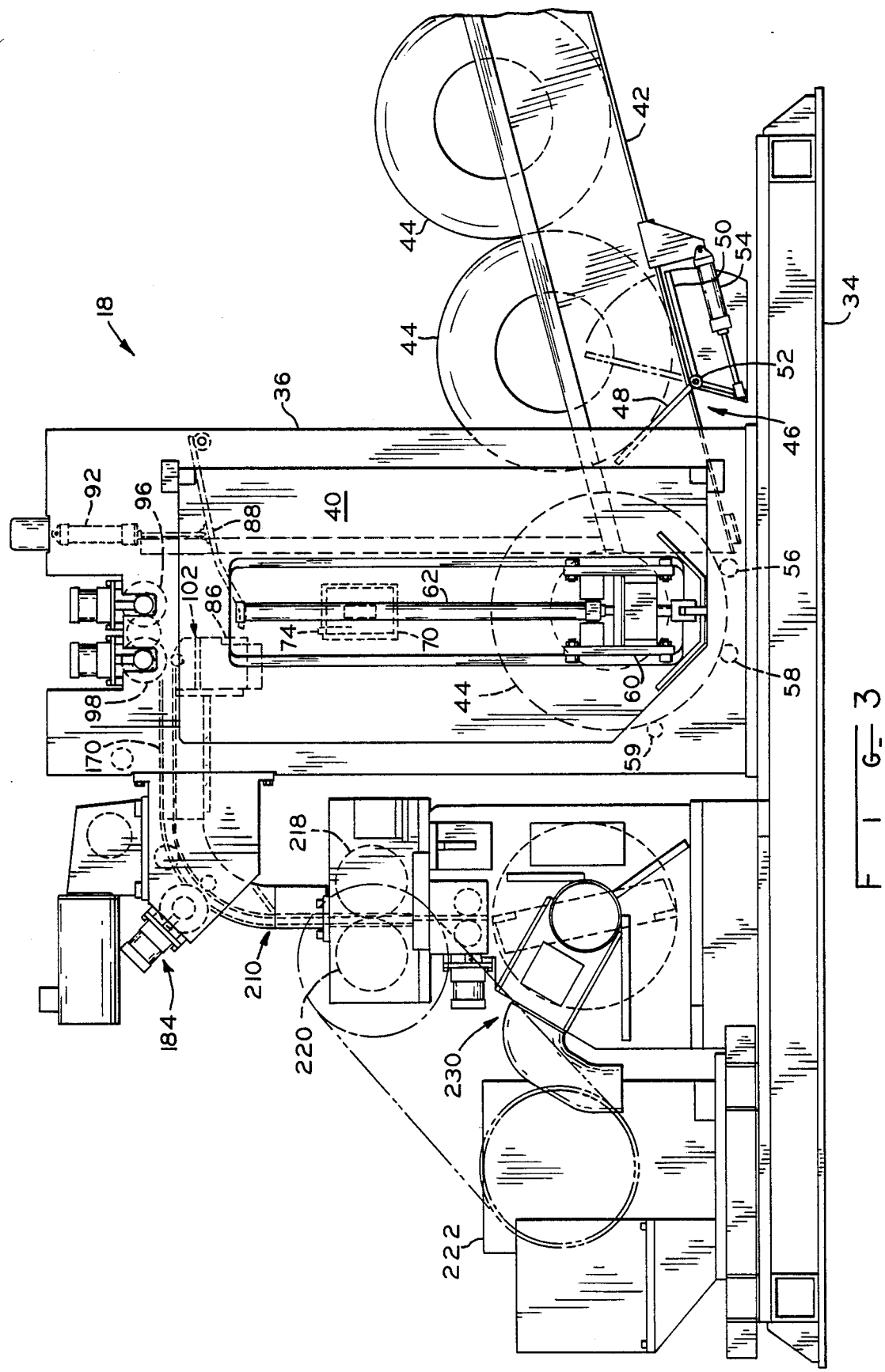
FIG—3

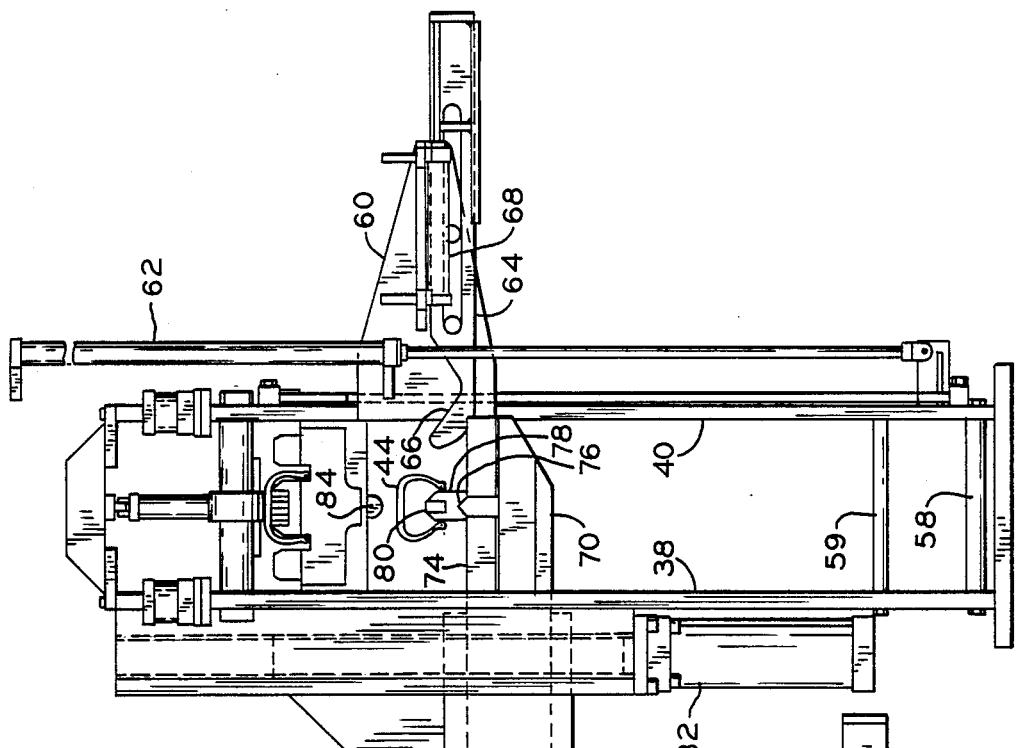
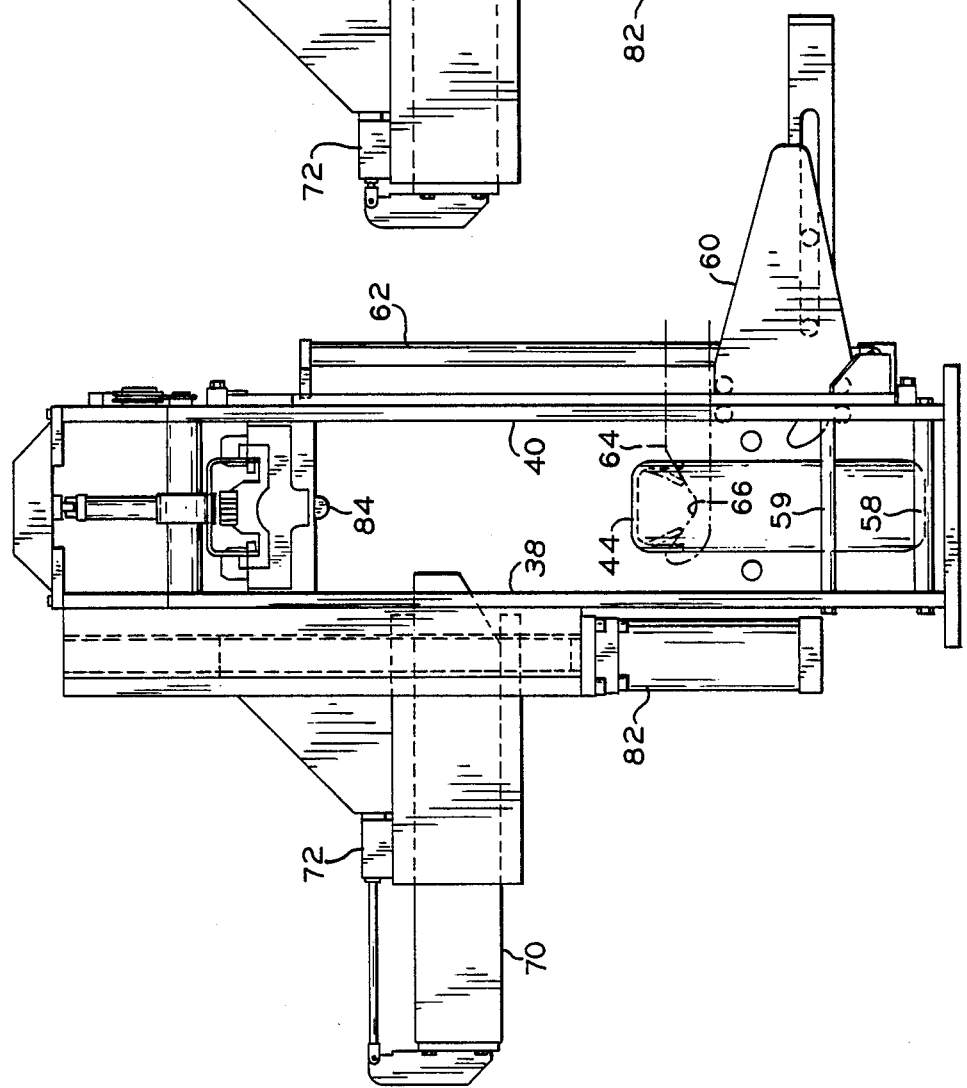
FIG-5
FIG-4

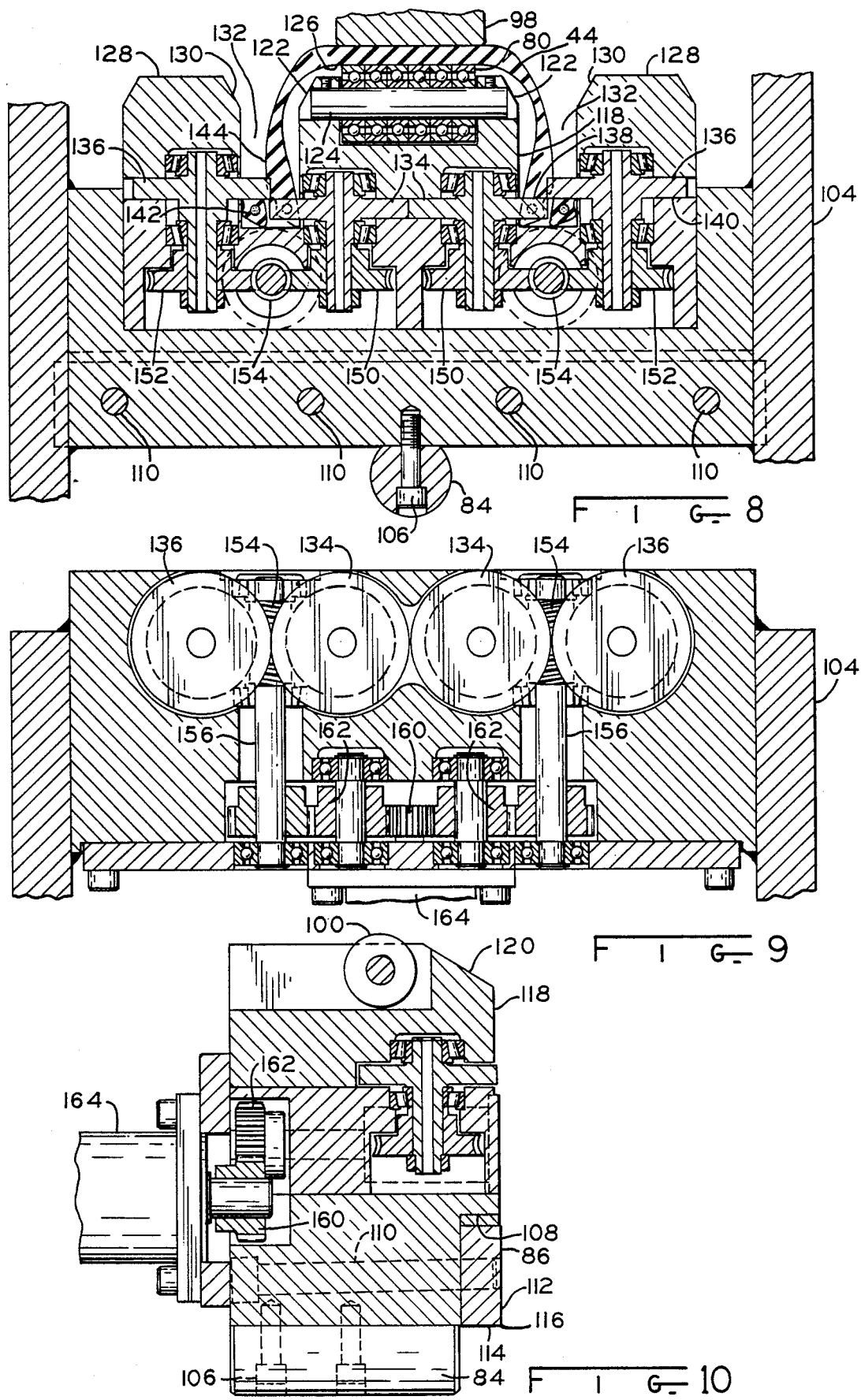

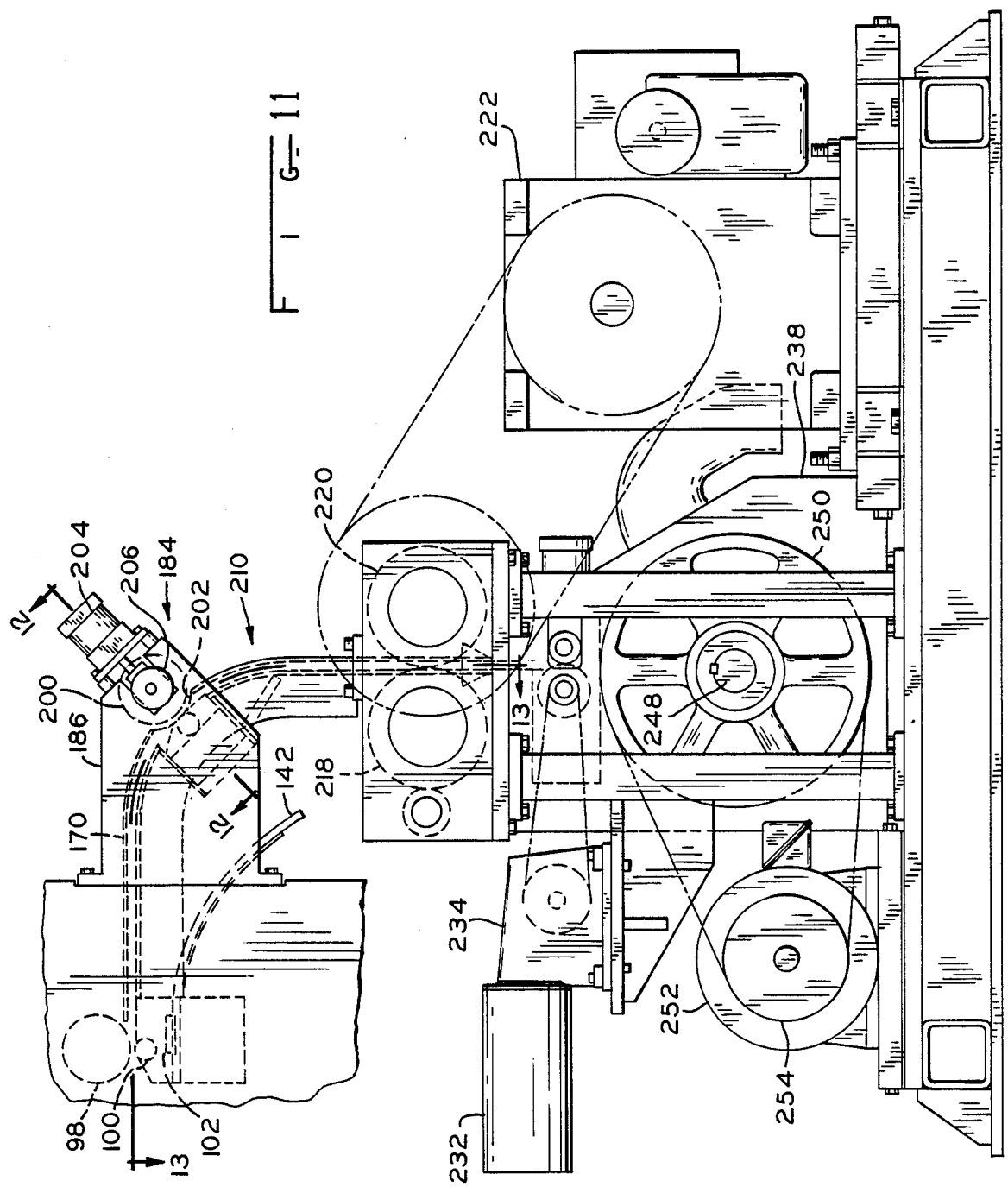

SCRAP TIRE PROCESSING APPARATUS

BACKGROUND OF THE INVENTION

The present invention relates generally to devices for processing scrap rubber tire carcasses, and more particularly to such a device in which the scrap tire carcass is reduced to particles.

A satisfactory solution to the problem of disposal of used rubber tires has been quite elusive. The common practice of merely stockpiling the tires with no real plan for ultimate disposal is unsatisfactory because such collections of tires are not only eyesores but can also constitute public health hazards. The many hollows formed within a pile of tire carcasses make attractive homes for rodents and are notorious for collecting and holding rainwater which can result in the generation of a substantial quantity of stagnant water in which mosquitoes breed prolifically.

Burying of used tire carcasses in landfills is not only wasteful of dwindling landfill space but is also not very effective. The peculiar shape of rubber tires and their resilient nature give rise to an interesting but annoying phenomenon in which the tires work their way back up to the surface under the influence of forces generated by freeze/thaw cycles.

Various devices for cutting up or shredding used tire carcasses have been proposed. These have the advantage of reducing the amount of space occupied by the tires, facilitating their permanent burial, and reducing or eliminating the public health problems. Nevertheless, tire carcasses are rather tough articles and a relatively large amount of energy can be expended in shredding one. If the ultimate resting place of the tire carcass is going to be a landfill anyway, there is little incentive to incur the additional expense of machinery, fuel and manpower needed to shred the tires, absent governmental regulation. Such regulation is not likely to be forthcoming until the problem is recognized as being of critical importance, and if forthcoming will add a considerable economic burden.

It would be desirable if the scrap rubber in the tires could be reused in a way having some intrinsic economic value, so that the costs of shredding the tires could be recovered or at least partially offset. Several uses for rubber particles are emerging. These include recycling the rubber particles into rubber pads, loading dock and marine bumpers, floor mats, traffic cones, drainage pipe, etc. Another application receiving increasing attention is a filler for road paving asphalt mixtures. Experimental research has shown that asphalt mix in which a portion of the aggregate has been replaced by used rubber tire particles has several advantageous characteristics which make it desirable for road paving purposes. Roads paved with rubber/asphalt mixtures enjoy a higher than normal coefficient of friction with respect to vehicle tires traveling thereon, thus increasing public safety by reducing the slipperiness of the pavement. Such pavements are also more resilient which makes them less likely to crack under the influence of vehicle load and freeze/thaw cycles. The resulting increase in pavement life is a significant advantage. The rubber/asphalt pavement mixtures which provide the above advantages require a rubber particle which is of fairly regular geometric shape and which can be readily graded by particle size. In all of the above mentioned applications, the particle size and "cleanliness" (freedom from contaminents) of the particles are of critical importance.

Prior known apparatus for shredding tires typically is designed to receive the used tire carcass whole and shred it with knives that "attack" the whole tire and tear and shred it. The result is nonuniform chunks of shredded and distressed rubber having cords, fibers and steel wires extending from the individual pieces. Such a product is unacceptable for pavement use.

It is desirable that an apparatus be provided which can process tires "whole" in the sense that the tire in its discarded state can be introduced into the apparatus without preliminary treatment and yet be reduced to particles of relatively uniform size and regular shape. It is further desirable that the resulting particles be to a large degree free from entrained polyester and steel contaminants so that the rubber can be readily separated from the contaminants by conventional separator means which operate on the principles of differential density or magnetic sorting. The present invention provides these features.

SUMMARY OF THE INVENTION

The present invention involves an apparatus which receives whole used tire carcasses, and in automatic sequential sequence cuts the tire through radially at one place, and "unwinds" the tire by advancing one of the exposed cut ends in a direction generally tangential to the circumference of the tire. Subsequent optional sections of the apparatus can remove the beads from the sidewalls in a continuous operation, and also slit the unwound tire longitudinally. The unwound tire is flattened in the sense that the sidewalls are splayed outwardly so as to lie in the same plane as the crown of the tire, and the so flattened tire is fed longitudinally into a granulator which chops the advancing tire at short intervals into strips or cubes which are then further reduced in size in the granulator or in a series of granulators.

The present invention provides for automated handling of the tire from initial loading of the tire carcass into the apparatus until it is ultimately reduced to particles. The radial cutting and unwinding operation followed by a flattening operation and longitudinal introduction into the granulator permits the tire carcass to be cleanly chopped into particles in a way which also chops the embedded steel and synthetic fibers into short lengths which are cut cleanly from the rubber particles so that they can be readily separated therefrom.

Efficiency of rubber separation is enhanced by the optional portions of the invention which remove the beads from the tire before introducing the tire into the granulator. This eliminates a major source of steel fiber while sacrificing only a relatively small amount of rubber. Another optional portion slits the tire longitudinally prior to introducing it into the granulator which results in an initial "cubing" of the tire carcass upon entering the granulator. This increases the efficiency and speed of the granulator and enhances the production of uniformly sized particles.

The invention, in one form thereof, provides an apparatus for processing a scrap rubber tire carcass of the type having a circumferential crown and a pair of sidewalls extending generally radially inwardly from and generally perpendicular to said crown, and each of the sidewalls has an inner circumferential edge. Said apparatus includes means for holding the tire carcass and means for cutting the held tire carcass completely through from the inner circumferential edge to the crown at only one place. Means are provided for advancing the cut tire carcass longitudinally in a direction generally tangent to the circumference of the crown while flattening the sidewalls such that the sidewalls and crown lie substantially in a common plane. Means for receiving the longitudinally advancing flattened tire carcass and simultaneously reducing the received tire carcass to particles are provided.

BRIEF DESCRIPTION OF THE DRAWINGS

FIG. 1 is a side elevational view of the tire processing apparatus of the present invention.

FIG. 2 is a top view of the tire processing apparatus of FIG. 1.

FIG. 3 is a side elevational view of the tire processing apparatus of FIG. 1, particularly showing the tire cutting, debeading, slitting and granulating apparatus.

FIG. 4 is an elevational view of the tire handling and locating portion of the apparatus of FIG. 1, showing the locator in its lower position and the ram in its retracted position FIG. 5 is an elevational view of the tire handling and locating portion of the apparatus of FIG. 1, showing the locator in its upper position and the ram in its extended position.

FIG. 8 is a cross-sectional view of the debeader cutters of the apparatus of FIG. 1, shown in relationship to a tire passing through the debeader.

FIG. 9 is a top view of the debeader cutters of the apparatus of FIG. 1.

FIG. 10 is a cross-sectional elevational view of the debeader portion of the apparatus of FIG. 1.

FIG. 11 is an elevational view of the tire processing apparatus of FIG. 1 shown from the side opposite that of FIG. 3.

DETAILED DESCRIPTION OF THE PREFERRED EMBODIMENT

Figure 6:
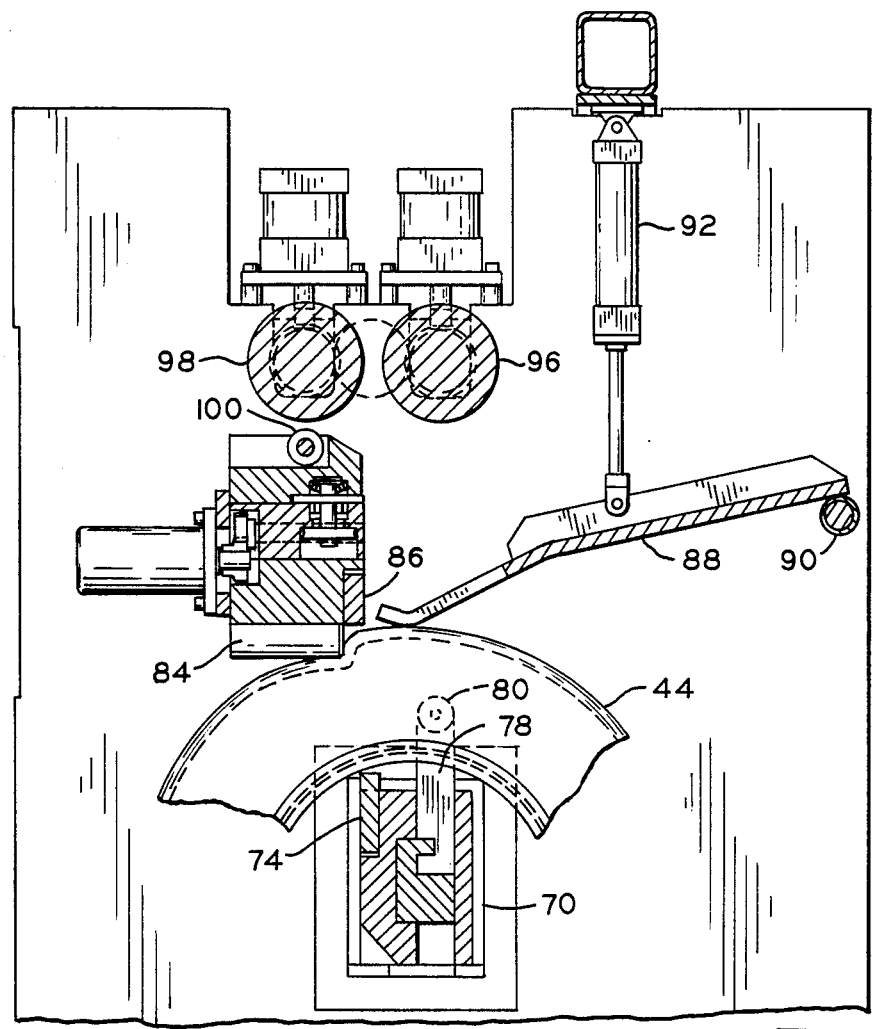
FIG. 6 is a detail view of the tire cutter and debeader portion of the apparatus of FIG. 3, particularly showing a tire in the process of being compressed for radial cutting.

Referring in particular to FIGS. 1 and 2, there is illustrated an apparatus 10 for processing scrap rubber tires. The apparatus could be truck mounted, if desired, so that the rubber tire carcasses can be received whole by apparatus 10 and be reduced to particles at a stockpile site. The reduced rubber particles can be transported away from the site for further use or disposal, as desired, at a cost that is less than the cost of transporting whole tires, due to the greater compactness of the load. Received on bed frame 12 is the tire processing apparatus designated generally by reference numeral 18. Processing apparatus 18 is configured to receive whole tire carcasses one after another and process them continuously to reduce them to particles, as will be described further below. Other equipment useful in connection with processing apparatus 18 is also included on bed frame 12, such as vibratory screen sorter 20, and storage bins 22 and 24.

Referring to FIGS. 3-5, processing apparatus 18 is illustrated in greater detail. Apparatus 18 is supported by a tubular horizontal frame 34 upon which is mounted an upstanding machine frame 36 having a pair of vertical walls 38 and 40 in parallel spaced relationship. An inclined chute 42 terminates between walls 38 and 40 and extends upwardly and outwardly therefrom in a plane generally parallel to walls 38 and 40. Chute 42 is sized and configured to receive and hold a plurality of used tire carcasses 44 which can be loaded therein manually one after another. Once loaded into the chute, all further handling and processing of the tires until they have been reduced to particles is achieved automatically by processing apparatus 18. Tire carcasses 44 are restrained in chute 42 by gate 46 which includes forward arm 48 and rearward arm 50 which are in fixed angular relationship to one another but which are mutually pivotable about pivot 52. Gate 46 is actuated by hydraulic cylinder 54 which when retracted causes forward arm 48 to lower, allowing the tire 44 resting against forward arm 48 to roll down chute 42. As forward arm 48 lowers, rearward arm 50 simultaneously raises and acts as a stop for the next successive tire residing in chute 42. The tire released by forward arm 48 rolls into an initial position in which it is supported by and centered on bars 56 and 58. Bar 59 also provides positioning for the tire and additionally acts as a stop to halt the tire as it rolls from the chute 42 into the initial position between walls 38 and 40.

A locator head 60 is mounted in sliding engagement with wall 40 of upstanding frame 36 such that head 60 can reciprocate vertically when actuated by hydraulic cylinder 62. Locator head 60 carries a horizontally reciprocable locator bar 64 having an upwardly open V-shaped notch 66. After a tire carcass 44 has been introduced onto bars 56 and 58, locator bar 64 is moved horizontally by hydraulic cylinder 68 so as to pass through the center opening of the tire and come to rest in a predetermined fixed position. Thereafter, locator head 60 is raised by hydraulic cylinder 62 so that notch 66 engages the top beads of the tire carcass and centers the tire carcass from side to side between walls 38 and 40 of upstanding frame 36. Locator head 60 continues to rise, carrying tire carcass 44 upwardly to a second position in which the center opening of the tire is aligned with ram 70.

Once tire carcass 44 is elevated to the second position and is hanging in V-notch 66 of horizontal locator 64, ram 70 is moved horizontally by ram hydraulic cylinder 72 such that ram 70 extends through the center opening of tire carcass 44. Ram 70 includes an upper edge comprising a horizontal square blade 74 having an intermediately located blade peak 76 which when ram 70 is fully extended is disposed below and between the beads of each sidewall of tire carcass 44. Extending upwardly from ram 70 proximate blade peak 76 is a vertically extensible locator 78 having a roller 80 rotatably mounted thereon for rotation about an axis parallel to the axis of tire carcass 44. A hydraulically actuated cam mechanism within ram 70 causes locator 78 to be extended upwardly from ram 70 between the beads and toward the crown of tire carcass 44 (FIGS. 5 and 6). Locator 78 spreads the beads somewhat and lifts tire carcass 44 sufficiently to permit horizontal locator 64 to be withdrawn from tire carcass 44 by hydraulic cylinder 68, whereupon horizontal locator 64, ram 70, locator 78 and tire carcass 44 are disposed in the relative positions illustrated in FIG. 5. Ram 70 is thereafter moved upwardly by vertical ram cylinder 82 until the top of the crown of tire carcass 44 engages anvil 84 which retards the upward movement of tire carcass 44 while ram 70 and locator 78 continue to rise.

Figure 7:
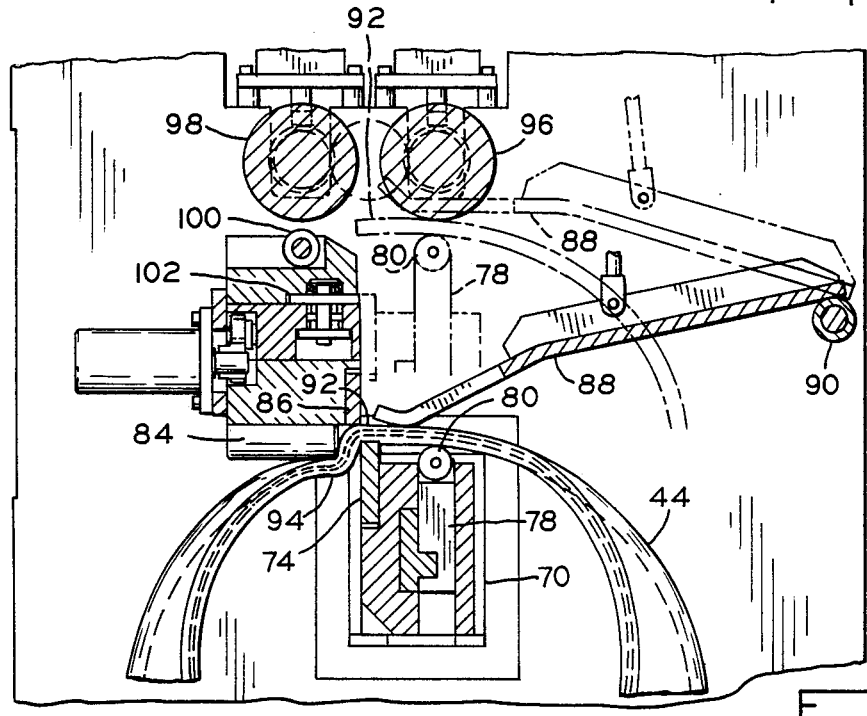
FIG. 7 is a detail view of the tire cutter and debeader portion of the apparatus of FIG. 3, particularly showing a tire in the process of being cut radially, with the cut tire shown in broken lines prior to entering the debeader.

Referring to FIGS. 6 and 7, horizontal square blade 74 is shown in cross-section and is aligned in scissors fashion with respect to a second square-edged cutting blade 86 located thereabove. As ram 70 together with blade 74 continues to rise, the beads and sidewalls of tire carcass 44 are compressed between blades 74 and 86, which results in the beads and sidewalls splaying outward such that the portion of tire carcass 44 between blades 74 and 86 becomes substantially flat as the blades approach one another. As blade 74 and ram 70 rise to meet blade 86, locator 78 is correspondingly retracted such that the crown of tire carcass 44 remains substantially at the level of blade 86 as the tire is compressed. Tire compressor lever 88 which is pivotally mounted at pivot 90 acts as an upper stop against which tire carcass 44 is compressed. Hydraulic cylinder 92 permits tire compressor lever 88 to be raised when appropriate, as described below. As ram 70 continues to raise and as blade 74 passes by blade 86 in close proximity thereto, the crown and sidewalls of tire carcass 44 are sheared or cut through radially. A first cut end 92 of tire carcass 44 initially remains compressed and held between blade 74, roller 80 and tire compressor lever 88 subsequent to cutting of the tire carcass, while a second cut end 94 falls loosely away from blades 74 and 86.

With particular reference to FIG. 7, the further processing of the cut tire carcass is described. Locator 78 is again extended upwardly with respect to ram 70 (as shown in chain lines) while ram 70 itself again begins to rise. Tire compressor lever 88 is simultaneously raised in concert with locator 78 such that the crown of tire carcass 44 is raised upwardly while remaining firmly held in compression between roller 80 and compressor lever 88. At the same time that ram 70 is rising, locator 78 is being extended upwardly with respect to ram 70, thereby causing the crown of the tire carcass 44 at the first cut end 92 to be displaced upwardly relative to ram 70. This permits the beads and sidewalls which where formerly splayed during cutting to assume their normal orientations such that the first cut end 92 is substantially U-shaped when viewed perpendicular to the plane of the radial cut. As shown in broken lines in FIG. 7, the crown of cut tire carcass 44 is raised while remaining held between roller 80 and tire compressor lever 88 until the top of the crown engages a motor-driven pinch roll 96 whereupon the crown is thereafter held in compression between pinch roll 96 and roller 80. Tire compression lever 88 is forked so as to permit it to rise clear of the crown of tire carcass 44 while yet avoiding interference with pinch roll 96.

When cut tire carcass 44 is in the upper position shown in FIG. 7, the crown of the tire is engaged by pinch roll 96 on the tread side and by roller 80 on the inside of the crown. The sidewalls and beads hang downwardly therefrom on either side of locator 78. Pinch roll 96 is driven so as to move the cut end 92 of tire carcass 44 in a direction substantially tangential to the tire circumference such that cut end 92 is advanced horizontally to the left (as shown in FIG. 7) toward a second pinch roll 98 and complimentary roller 100. Just prior to arriving at the second pinch roll 98, the beads at the bottom of the sidewalls at cut end 92 encounter rotary debeading blades 102 which shear off the beads as the tire carcass passes therethrough. The tire carcass is thus pushed into the debeading blades 102 by pinch roll 96 and roller 80, and pulled therethrough by pinch roll 98 and roller 100. The separated tire beads fall free to either side for later processing or disposal.

Referring in particular to FIGS. 8-10, debeader 102 is shown in greater detail. Debeader 102 includes a frame 104 to the underside of which a substantially cylindrical anvil 84 is secured by bolts 106. Horizontal cutting blade 86 is secured in a recess 108 at the front lower portion of frame 104 by bolts 110. Blade 86 has adjoining orthogonal surfaces 112 and 114 which form a square cutting edge 116, which edge cooperates with blade 74 in a scissors-like cutting action. Disposed at the upper part of frame 104 is an upstanding center guide 118 having a bevel 120 at the top front portion thereof and bevels 122 at the top side portions thereof. Mounted in center guide 118 by shaft 124 is ball bearing roller 80. The circumference of roller 80 extends upwardly somewhat above the top of center guide 118 and engages the inside surface 126 of the crown of cut tire carcass 44. The top surface of the crown in engaged by pinch roll 98 disposed in opposition to roller 80. Located to either side of center guide 118 is a pair of upstanding sidewall guides 128 each having a bevel 130 at the top side portion thereof facing center guide 118. Sidewall guides 128 and center guide 118 define therebetween a pair of vertical guide channels 132 disposed on either side of center guide 118 for receiving therein the sidewalls and beads of tire carcass 44, and for guiding the sidewalls and beads into the rotary debeading blades of debeader 102.

The debeading blades comprise a pair of inner disk-shaped blades 134 mounted in bearing journals for rotation about vertical axes. Interacting with inner blades 134 is a pair of outer disk-shaped blades 136 likewise mounted in bearing journals for rotation about vertical axes. The circumference of each inner blade 134 is disposed tangent to the circumference of the corresponding outer blade 136, and the inner and outer blades are offset axially with respect to each other such that the upper surface 138 of inner blade 134 is disposed in substantially the same plane as the lower surface 140 of outer blade 136. The inner and outer blades 134 and 136 rotate in opposite directions so as to pull the sidewall into the nip formed therebetween. Consequently, the sidewall is sheared through by a scissors action of blades 134 and 136 with respect to each other. Beads 142 are thereby separated from the sidewalls 144. The location of the separated beads within guide channels 132 is shown in dotted lines in FIG. 8.

Connected to each of the inner and outer blades 134 and 136 on a common shaft therewith are inner and outer gears 150 and 152, respectively. Each respective pair of inner and outer gears 150 and 152 is driven by a worm gear 154 disposed therebetween and engaging both gears simultaneously so as to drive them in synchrony in opposite directions.

Worm gears 154 are driven at the same speed and in synchrony with one another, although incidentally in opposite directions with respect to each other. Since it is necessary that each respective pair of inner and outer disk blades 134 and 136 be driven so as to pull both sidewalls of tire carcass 44 together in the same direction, the worm gears 154 are threaded in opposite hand to compensate for the fact that they rotate in opposite directions with respect to one another. This will be more readily apparent if one considers that each worm gear 154 has a shaft 156 to which is connected a drive gear 158 which is in turn ultimately driven by a single drive gear 160 via intermediate gears 162. Drive gear 160 is disposed between and engages simultaneously each of the intermediate gears 162, causing each one of the pairs of gears 162 and 158 to rotate opposite to one another. Drive gear 160 is powered by a hydraulic motor 164.

Referring in particular to FIG. 11, there is illustrated that portion of tire processing apparatus 18 which is "downstream" of debeader 102, i.e., that portion which further processes tire carcass 44 subsequent to the removal of the beads 142. FIG. 11 shows the opposite side of apparatus 18 from that shown in FIG. 3.

Beads 142 which have been sheared from sidewalls 144, or "debeaded", exit from debeader 102 along with the remainder of the carcass consisting of the sidewalls and crown. The beads exit downwardly and to the sides and can be directed by appropriate guides and chutes (not shown) into collection receptacles for disposal, or further processing if desired. The beads are so removed primarily because they contain a large amount of steel in relation to the rubber, which steel would tend to cause undue wear on the subsequent tire carcass processing apparatus in return for a rather small amount of additional recovered rubber.

Figure 12:
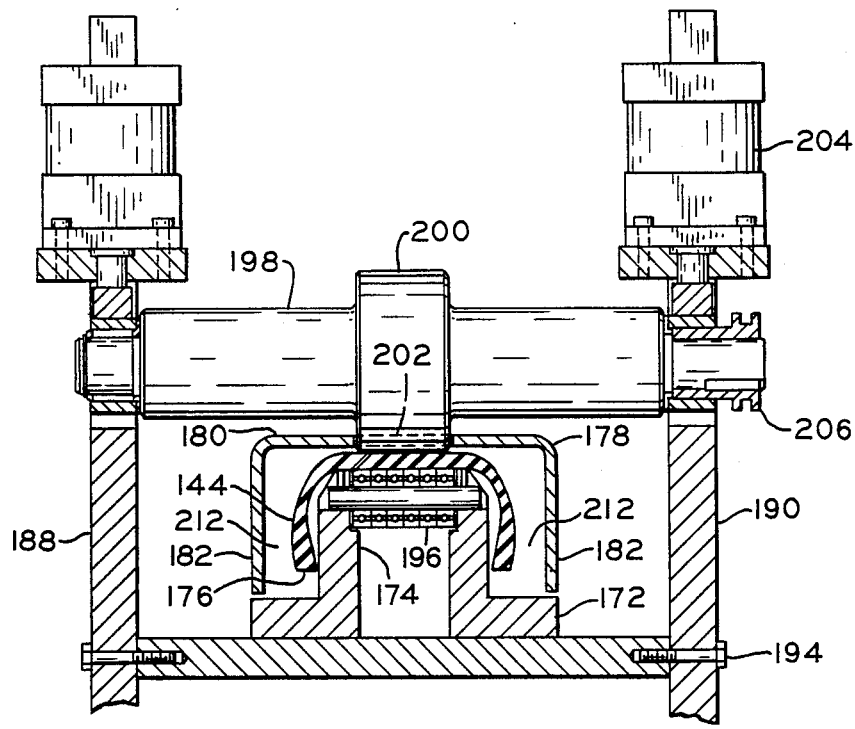
FIG. 12 is a cross-sectional view of a pinch roll taken along section line 12—12 of FIG. 11.

The crown and sidewalls which exit debeader 102 remain substantially U-shaped in cross-section as they enter guide channel 170 which, as illustrated in FIG. 12, is likewise U-shaped in cross-section. A base portion 172 and an upstanding center portion 174 which extends therefrom together form an inverted T-shaped rail which extends below the cut edges 176 of sidewalls 144 and upwardly between the sidewalls toward the inside of the crown of the tire carcass. Overlying the outside of the crown and sidewalls is an inverted U-shaped cover 178 the top 180 of which overlies the crown and the legs 182 of which overlie the sidewalls. Referring again to FIG. 11, guide channel 170 extends initially horizontally from debeader 102 and then curves 90° downwardly in a smooth arc so as to extend finally vertically downward.

Disposed midway through the arc of curvature is a driven pinch roll assembly 184 (shown in cross-section in FIG. 12). Pinch roll assembly 184 is supported by a machine frame 186 including frame walls 188 and 190 connected to machine frame walls 40 and 38, respectively. Crosspiece 192 is disposed between walls 188 and 190, is secured thereto by bolts 194, and supports base 172 of channel 170. Supported by upstanding center portion 174 of base 170 is a roller 196 which extends upwardly of center portion 174 and engages the inside of the crown of the tire carcass. Journalled in walls 188 and 190 and extending therebetween is a pinch roll shaft 198 having an enlarged annular center roll portion 200 which extends through an opening 202 in cover 178 and engages the outside of the crown of the tire carcass. The clearance between pinch roll 200 and roller 196 is adjusted by hydraulic motors 204. Pinch roll shaft 198 is belt driven via pulley 206. Pinch roll assembly 184 aids in pulling the debeaded tire carcass around the curved portion of channel 170. The tire carcass would otherwise encounter frictional resistance with channel 170 as it traversed the curve which could lead to buckling and jamming of the carcass. Assembly 184 also pushes the debeaded tire carcass against the subsequent sidewall spreader 210, described further below, which is a source of frictional resistance to the forward progress of the tire carcass.

Sidewall spreader 210 comprises a portion of channel 170 downstream of pinch roll assembly 184 in which channel 170 undergoes a transition from being essentially U-shaped in cross-section to being essentially flat in cross-section. As debeaded tire carcass 44 passes endwise through transitional section 210, its cross-sectional profile likewise undergoes a change of shape as the sidewalls are splayed outwardly until they lie in substantially the same plane as the crown of the tire. The debeaded tire carcass at that stage can be described as having been "unrolled" and flattened such that it is essentially a flat ribbon of reinforced rubber having a width equal to the sum of the widths of the sidewalls and the crown, and a length equal to the circumference of the tire carcass.

Figure 13:
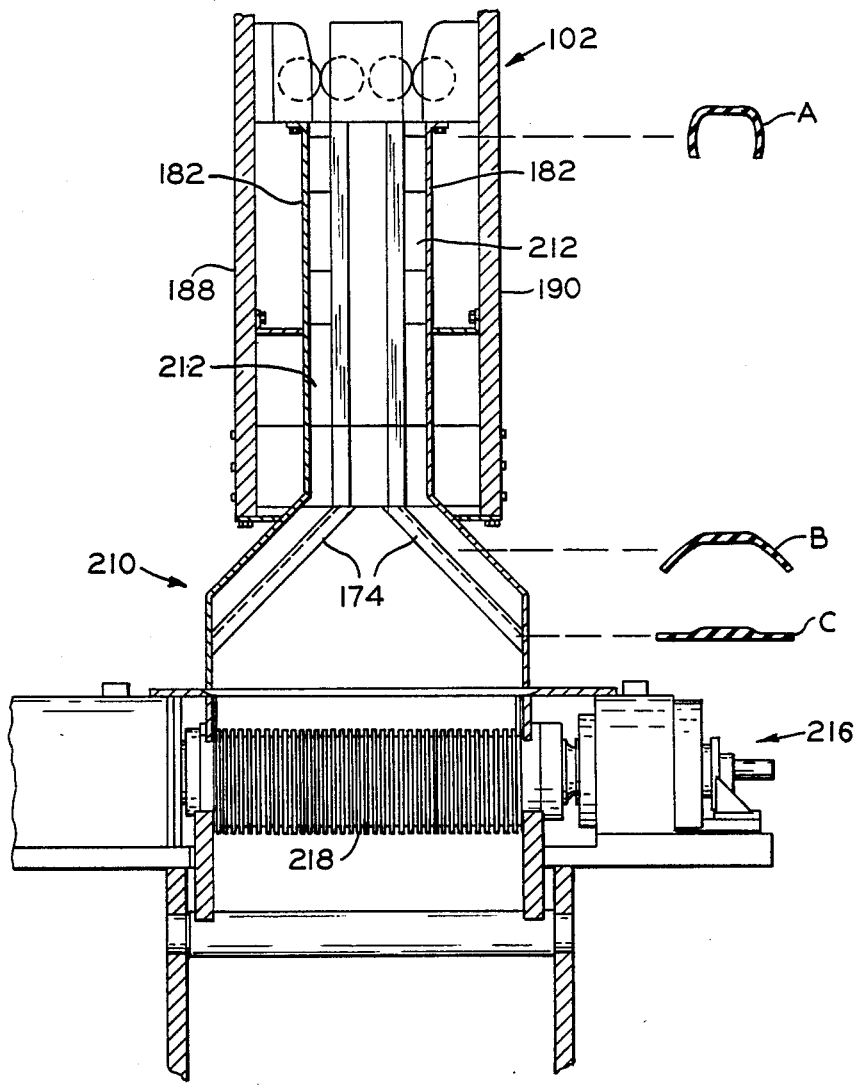
FIG. 13 is a cross-sectional view of the slitter portion of the apparatus of FIG. 1, taken along section line 13—13 of FIG. 11.

Channel 170 and sidewall spreader portion 210, as well as the spreading action of the debeaded tire carcass, are explained more fully with reference to FIGS. 11 and 13. Immediately after exiting debeader 102 debeaded tire carcass 44 has a substantially U-shaped cross-section and is disposed within correspondingly shaped channel 170, as described previously with reference to FIG. 12. Between upstanding center portion 174 and sides 182 of cover 178 are defined a pair of spaces 212 constituting the legs of a generally U-shaped space into which the sidewalls of the tire carcass are received. Debeaded tire carcass 44 has the cross-sectional shape shown at A in FIG. 13. As the tire carcass encounters spreader portion 210, the sidewalls begin to splay outwardly until the cross-sectional shape is like that shown at B in FIG. 13. Further passage of the tire carcass therethrough results in the ultimate essentially flat cross-sectional shape shown at C in FIG. 13. Upstanding center portion 174 of channel 170 is shown as splaying outwardly (as viewed in FIG. 13) at about an angle of 45° in the down stream direction with respect to the longitudinal direction of channel 170. Simultaneously, base portion 172 slopes upwardly (as viewed in FIG. 11)toward cover 178 until ultimately base portion 172 is at the same level as the top of upstanding portion 174. Described in another way, from the perspective of the advancing end of the debeaded tire carcass, the U-shaped space in which the tire carcass travels becomes progressively wider and shallower such that the space between the top of upstanding portion 174 and the top of cover 180 becomes wider as the height of side spaces 212 becomes shorter. Cover 178, naturally, undergoes a corresponding shape transition.

Referring again to FIGS. 11 and 13, the flattened tire carcass upon exiting spreader portion 210 is introduced into a longitudinal slitter 216 which slits the tire carcass longitudinally into parallel narrow strips. Slitter 216 includes a pair of slitter rolls 218 and 220 each of which has a plurality of cutter disks evenly spaced on a shaft. The thickness of each cutter disk is the same as the width of the space between adjacent disks, with the cutter disks of roll 218 being offset one thickness unit in the axial direction with respect to those of roll 220. The periphery of roll 218 overlaps slightly the periphery of roll 220 such that the cutter disks of each roll are interdigitated with those of the other roll. As the flattened tire carcass passes between rolls 218 and 220, it is sheared into strips by the scissors action of the rolls with respect to one another. The resulting strips have a width substantially the same as the width of the cutter disks and their intermediate spaces. Rolls 218 and 220 are driven by an electric drive motor 222.

Figure 14:
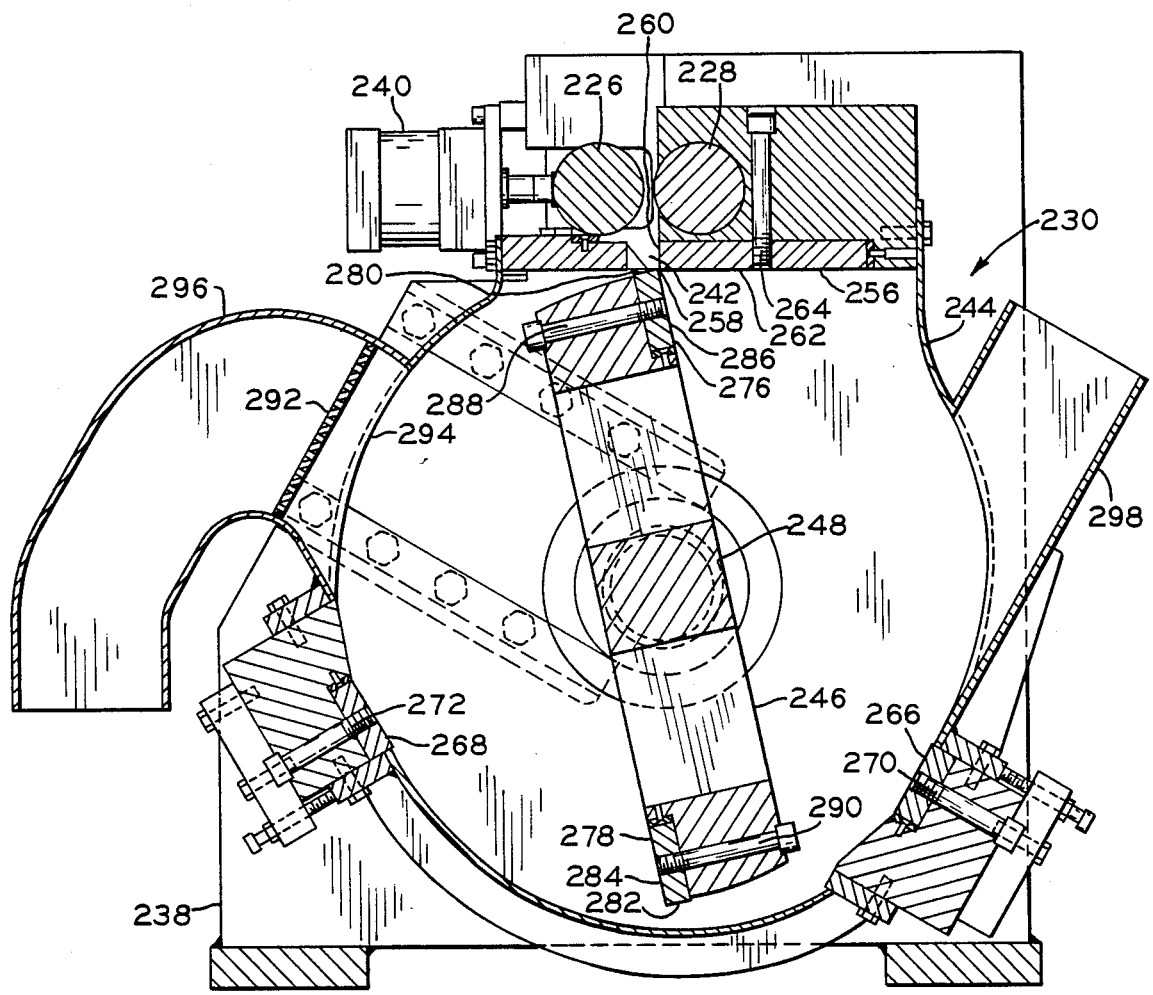
FIG. 14 is an elevational cross-sectional view of the granulator of the apparatus of FIG. 1.

With particular reference to FIGS. 11 and 14, the further processing of the tire carcass is described. Upon exiting slitter 216, the longitudinally slit flat tire carcass immediately encounters a pair of opposed driven pinch rolls 226 and 228 which are associated with a subsequent granulator 230, described further below. Pinch rolls 226 and 228 are belt driven by an electric drive motor 232 and reduction transmission 234. Rolls 226 and 228 have a somewhat roughened finish surface which facilitates frictionally gripping the slit tire therebetween and accurately advancing it into the granulator at a selected speed controlled by drive motor 232 and transmission 234. The advantage of such speed selection will become apparent from the following description of granulator 230.

Granulator 230 includes a frame 238 to which is attached a motor 240 for adjusting the location of pinch roll 226 with respect to pinch roll 228 so that the space therebetween into which the slit flat tire carcass is received can be adjusted for optimum gripping of the carcass. Pinch rolls 226 and 228 drive the tire carcass downwardly through a slot 242 into granulator drum 244 which is an approximately round cylinder in which is disposed a massive balanced rotor 246 on a shaft 248 which is journalled in frame 238. A pulley 250 mounted on shaft 248 outboard of frame 238 is belt driven by an electric drive motor 252 and drive pulley 254. Immediately adjacent slot 242 one of three stationary square-edged cutting blades 256 disposed. The cutting edge 258 of blade 256 is formed at the juncture of mutually orthogonal surfaces 260 and 262. Blade 256 is secured to frame 238 by bolts 264 which facilitate replacement of the blades when they become excessively worn. Similar stationary blades 266 and 268 are mounted to frame 238 by bolts 270 and 272, respectively. Blades 262, 266 and 268 are equidistantly spaced about the circumference of drum 244.

Rotor 246 has mounted at either end thereof square-edged blades 276 and 278 each of which has an outer surface 280 and 282, respectively which is perpendicular to a radius of rotor shaft 248 and which exhibit a rotational clearance of a few thousandths of an inch with respect to stationary blades 262, 266, and 268. The front faces 284 and 286 of rotor blades 276 and 278 are mutually orthogonal with respect to surfaces 280 and 286 and are located on that side of each end of rotor 246 which faces in the direction of rotation. Rotor blades 276 and 278 are secured to rotor 246 by bolts 288 and 290 for ease of replacement as in the case of the stationary blades.

Since the slit tire carcass is advanced into drum 244 through slot 242 by pinch rolls 226 and 228 at a constant speed, the tire carcass is consequently sheared transverse to its longitudinal advancement with each half revolution of rotor 246 as blades 276 and 278 successively act against stationary blade 242. Because of this, the length of tire carcass which advances into drum 244 between successive shearing actions is determined by the speed of rotation of pinch rolls 226 and 228 and the speed of rotation of rotor 246. Optimization of operation can be achieved by a proper combination of these speeds. Since tire carcass 44 is already slit longitudinally prior to entering slot 242, the shearing action of blade 276 against blade 262 effectively results in the creation of small cubes of rubber with each half rotation of rotor 246. The cubes of rubber thus initially sheared fall into drum 244 where they are swept around in a clockwise direction (as viewed in FIG. 14) by rotor 246. A certain portion of the cubes will find themselves lodged between one or the other of the rotating blades 276 and 278 and one of the stationary blades 262, 266 and 268, where they will be randomly sheared again and again, resulting in a further reduction of particle size. The walls of drum 244 are not perfectly round but rather converge radially inwardly as they approach stationary blades 266 and 268. This configuration helps direct the circulating particles into contact with the blades. The walls of drum 244 diverge again on the downstream side of the stationary blades so that free random motion can be restored to the reduced particles and jamming of the particles against the walls of the drum is alleviated.

As the tire carcass is fed into drum 244, the total amount of reduced rubber particles begins to accumulate therein as the older particles continue to be reduced in size at the same time that new cubes are introduced. The dynamic action of the particles induced by the rapidly rotating rotor 246 results in reduced particles being directed against perforated plate 292 disposed across outlet opening 294 located in the upper quadrant of drum 244 above the last stationary cutting blade 268. Plate 292 has a plurality of perforations whose size and spacing is selected to act as a grading filter. Only when a rubber particle has been sufficiently reduced in size to pass through the perforations can it leave drum 244 and avoid further reducing action. Such particles which pass through plate 292 exit through chute 296 where they can be collected in bags or directed by other conveying means (not shown) to further storage or processing equipment, or directly into a truck or transportable container. Granulator 230 is provided with an auxiliary input chute 298 through which rubber scraps can be introduced manually, if desired. Scraps introduced in such a way will not be subject to the initial cubing action as are tire carcasses introduced by pinch rollers 226 and 228, but they will be subject to the random reduction action of the blades as the scraps circulate with drum 244.

It should be appreciated that the debeading operation is not strictly necessary as a prerequisite to reduction of the tire carcass to particles in those cases where a higher degree of contamination of the reduced rubber particles by steel fibers can be tolerated. In this case, however, faster wear of the cutting blades of granulator 230 should be expected.

Likewise, it is not necessary that the granulator 230 be preceded by slitter rolls. In the absence of slitter rolls 218 and 220, the initial shearing of the tire carcass entering granulator 230 would result in a strip of rubber having a length equal to the combined width of the sidewalls and crown of the tire carcass. Once such a strip has been sheared off, it will spring back due to the resiliency of the rubber tire to a generally U-shaped slice. This shape will quickly find itself caught up by the interaction of the rotating and stationary blades and be reduced to particles, although perhaps not as quickly or as uniformly as when the slitter is employed.

Whether one chooses to include the debeader or slitting operations will depend upon the degree to which steel contaminants can be tolerated and the degree of uniformity of particle size and shape which are desired for the application at hand.

Granulator 230 may be provided with additional arms on rotor 246, if desired. Furthermore, the system may include a plurality of granulators connected in series or parallel, depending on the size of rubber particles that is desired. Granulator 230 may discharge into a second granulator (not shown) that is smaller and operates at a higher speed to reduce the particle size even further. The second granulator may comprise more or less blades and the number of blades can be either odd or even, depending on the particular application. For example, the second granulator could comprise five blades. The configuration of the system can be altered, depending on the nature of the tire being processed and the desired particle size of the final product.

While the present invention has been particularly described in terms of a preferred embodiment, it will be understood that the invention is not limited thereby. Therefore, it is intended that the scope of the invention include any variations, uses or adaptations of the invention following the general principals thereof and including such departures from the disclosed embodiment as come within known or customary practice in the art to which the invention pertains and which fall within the appended claims or the equivalents thereof.

What is claimed is:

1. An apparatus for processing a scrap rubber tire carcass, the tire carcass having a circumferential crown and a pair of sidewalls extending generally radially inwardly from and generally perpendicular to the crown, each of the sidewalls having an inner circumferential edge, said edges defining a center opening, said apparatus comprising:
    means for holding the tire carcass;
    means for cutting radially at only one place the held tire carcass completely through from the inner circumferential edges to the crown;
    means for advancing the cut tire carcass longitudinally in a direction being at least initially generally tangent to the circumference of the crown;
    means for receiving the longitudinally advancing cut tire carcass and continuously flattening the sidewalls; and
    means for receiving the longitudinal advancing flattened tire carcass and simultaneously reducing the received tire carcass to particles.

2. The apparatus of claim 1, in which said means for cutting cuts substantially along a single radius of the carcass.

3. The apparatus of claim 1, in which said means for cutting includes a first blade extending through the center opening and a second blade disposed outside the tire carcass, said first and second blades being operable against one another to cut through the tire carcass disposed therebetween, and means connected to said means for holding for reciprocally moving said first and second blades against one another.

4. The apparatus of claim 1, in which said means for receiving and flattening includes a channel having an initial portion having a substantially U-shaped cross-section into which the cut tire carcass is received longitudinally, said channel having a final portion having a substantially flat cross-section, and said channel having a transitional portion intermediate said initial and final portions, said transitional portion having a cross-section varying from substantially U-shaped to substantially flat.

5. The apparatus of claim 4, in which said means for holding includes at least one pair of said opposed rollers of said means for advancing engaging the crown of the tire to one side of said means for cutting, whereby a cut end resulting from said means for cutting can be advanced thereby.

6. The apparatus of claim 1, in which said means for advancing includes at least one pair of opposed rollers engaging the inside and outside surfaces respectively of the crown of the tire carcass, at least one of said pair of roller being driven.

7. An apparatus for processing a scrap rubber tire carcass, the tire carcass having a circumferential crown and a pair of sidewalls extending generally radially inwardly from and generally perpendicular to the crown, each of the sidewalls having beads and an inner circumferential edge, said edges defining a center opening, said apparatus comprising:
    means for holding the tire carcass;
    means for cutting radially at only one place the held tire carcass completely through from the inner circumferential edges to the crown;
    means for advancing the cut tire carcass longitudinally in a direction being at least initially generally tangent to the circumference of the crown;
    means for receiving the longitudinally advancing cut tire carcass and continuous removing the beads from the sidewalls;
    means for receiving the longitudinally advancing cut tire carcass and continuously flattening the sidewalls such that the sidewalls and crown lie substantially in a common plane; and
    means for receiving the longitudinally advancing flattened tire carcass and simultaneously reducing the received tire carcass to particles.

8. The apparatus of claim 7, in which said means for cutting cuts substantially along a single radius of the carcass.

9. The apparatus of claim 7, in which said means for removing the beads includes a pair of rotating blades aligned with each sidewall and disposed for receiving said sidewall therebetween, said pair of rotating blades being disposed with respect to one another and to said means for advancing such that each sidewall received therebetween is sheared through, whereby the beads are removed.

10. The apparatus of claim 7, in which said means for cutting includes a first blade extending through the center opening and a second blade disposed outside the tire carcass, said first and second blades being operable against one another to cut through the tire carcass disposed therebetween, and means connected to said means for holding for reciprocally moving said first and second blades against one another.

11. The apparatus of claim 7, in which said means for receiving and flattening includes a channel having an initial portion having a substantially U-shaped cross-section into which the cut tire carcass is received longitudinally, said channel having a final portion having a substantially flat cross-section, and said channel having a transitional portion intermediate said initial and final portions, said transitional portion having a cross-section varying from substantially U-shaped to substantially flat.

12. The apparatus of claim 7, in which said means for advancing includes at least one pair of opposed rollers engaging the inside and outside surfaces respectively of the crown of the tire carcass, at least one of said pair of rollers being driven.

13. The apparatus of claim 12, in which said means for holding includes at least one pair of said proposed rollers of said means for advancing engaging the crown of the tire to one side of said means for cutting, whereby a cut end resulting from said means for cutting can be advanced thereby.

14. An apparatus for processing a scrap rubber tire carcass, the tire carcass having a circumferential crown and a pair of sidewalls extending generally radially inwardly from and generally perpendicular to the crown, each of the sidewalls having an inner circumferential edge, said edges defining a center opening, said apparatus comprising:
   means for holding the tire carcass;
   means for cutting at only one place the held tire carcass through from the inner circumferential edge to the crown substantially along a single radius;
   means for advancing the cut tire carcass longitudinally in a direction being at least initially generally tangent to the circumference of the crown;
   means for receiving the longitudinally advancing cut tire carcass and continuously flattening the sidewalls such that the sidewalls and crown lie substantially in a common plane;
   means for receiving the longitudinally advancing cut and flattened tire carcass and continuous slitting said carcass longitudinal into a plurality of parallel strips; and
   means for receiving the longitudinally advancing flattened and slit tire carcass and simultaneously reducing the received tire carcass to particles.

15. The apparatus of claim 14, in which said means for slitting includes a pair of opposed rolls whose axes are disposed on either side of the flattened carcass, each roll having a plurality of axially spaced cutting disks, the cutting disks of the opposite rolls being interdigitated, whereby the flattened tire carcass received therebetween is sheared into parallel strips.

16. The apparatus of claim 14, in which said means for cutting apparatus a first blade extending through the center opening and a second blade disposed outside the tire carcass, said first and second blades being operable against one another the cut through the tire carcass disposed therebetween, and means connected to said means for holding for reciprocally moving said first and second blades against one another.

17. The apparatus of claim 14, in which said means for receiving and flattening includes a channel having an initial portion having a substantially U-shaped cross-section into which the cut tire carcass is received longitudinally, said channel having a final portion having a substantially flat cross-section, and said channel having a transitional portion intermediate said initial and final portions, said transitional portion having a cross-section varying from substantially U-shaped to substantially flat.

18. The apparatus of claim 14, in which said means for advancing includes at least one pair of opposed rollers engaging the inside and outside surfaces respectively of the crown of the tire carcass, at least one of said pair of rollers being driven.

19. The apparatus of claim 18, in which said means for holding includes at least one pair of said opposed rollers of said means for advancing engaging the crown of said tire to one side of said means for cutting, whereby a cut end resulting from said means for cutting can be advanced thereby.

20. An apparatus for processing a scrap rubber tire carcass, the tire carcass having a circumferential crown and a pair of sidewalls extending generally radially inwardly from and generally perpendicular to the crown, each of sidewalls having an inner circumferential edge, said edges defining a center opening, said apparatus comprising:
   means for holding the tire carcass;
   means for cutting at only one piece the held tire carcass through from the inner circumferential edges to the crown substantially along a single radius;
   means for advancing the cut tire carcass longitudinally in a direction being at least initially generally tangent to the circumference of the crown;
   means for receiving the longitudinally advancing cut tire carcass and continuously removing the beads from said sidewalls;
   means for receiving the longitudinally advancing cut tire carcass and continuously flattening the sidewalls such that the sidewalls and crown lie substantially in a common plane;
   means for receiving the longitudinally advancing cut and flattened tire carcass and continuously slitting said carcass longitudinally into a plurality of parallel strips; and
   means for receiving the longitudinally advancing flattened and slit tire carcass and simultaneously reducing the received tire carcass to particles;

21. The apparatus of claim 20, in which said means for removing the beans includes a pair of rotating blades aligned with each sidewall and disposed for receiving the sidewall therebetween, said pair of rotation blades being disposed with respect to one another and to said means for advancing such that each sidewall received therebetween is sheared through, whereby the beads are removed.

22. The apparatus of claim 20, in which said means for slitting includes a pair of opposed rolls whose axes are disposed on either side of said flattened carcass, each roll having a plurality of axially spaced cutting disks, the cutting disks of the opposed rolls being interdigitated, whereby the flattened tire carcass received therebetween is sheared into parallel strips.

23. The apparatus of claim 20, in which said means for cutting includes a first blade extending through the center opening and a second blade disposed outside the tire carcass, said first and second blades being operable against one another to cut through the tire carcass disposed therebetween, and means connected to said means for holding for reciprocally moving said first and second blades against one another.

24. The apparatus of claim 20, in which said means for receiving and flattening includes a channel having an initial portion having a substantially U-shaped cross-section into which the cut tire carcass is received longitudinally, said channel having a final portion having a substantially flat cross-section, and said channel having a transitional portion intermediate said initial and final portions, said transitional portion having a cross-section varying from substantially U-shaped to substantially flat.

25. The apparatus of claim 20, in which said means for advancing includes at least one pair of opposed rollers engaging the inside and outside surfaces respectively of the crown of the tire carcass, at least one of said pair of roller being driven.

26. The apparatus of claim 25, in which said means for holding includes at least one pair of said opposed rollers of said means for advancing engaging the crown of the tire to one side of said means for cutting, whereby a cut end resulting from said means for cutting can be advanced thereby.

* * * * *

UNITED STATES PATENT AND TRADEMARK OFFICE
CERTIFICATE OF CORRECTION

PATENT NO. : 4,925,113

DATED : May 15, 1990

INVENTOR(S) : Terry L. Wissman et al

It is certified that error appears in the above-identified patent and that said Letters Patent is hereby corrected as shown below:

```
Claim 13, Col. 13, line  2, change "proposed" to --opposed--
Claim 14, Col. 13, line 15, change "edge" to --edges--;
Claim 14, Col. 13, line 25, change "continuous" to
     --continuously--;
Claim 14, Col. 13, line 26, change "longitudinal" to
     --longitudinally--;
Claim 15, Col. 13, line 35, change "opposite" to
     --opposed--;
Claim 16, Col. 13, line 39, change "apparatus" to
     --includes--;
Claim 16, Col. 13, line 42, change "the" first occurrence,
     to --to--;
Claim 20, Col. 14, line  6, change "piece" to --place--;
Claim 21, Col. 14, line 26, change "beans" to --beads--.
```

Signed and Sealed this

Sixth Day of August, 1991

Attest:

HARRY F. MANBECK, JR.

Attesting Officer

Commissioner of Patents and Trademarks